UNITED STATES PATENT OFFICE.

ROBERT MACPHERSON, OF BRONDESBURY, AND WILLIAM E. HEYS, OF BUSHEY, ENGLAND.

MANUFACTURE OF DETERSIVE AND EMULSIVE AGENTS.

1,373,900.  Specification of Letters Patent.  Patented Apr. 5, 1921.

No Drawing.  Application filed May 23, 1916. Serial No. 99,409.

*To all whom it may concern:*

Be it known that we, ROBERT MACPHERSON, a resident of Brondesbury, in the county of Middlesex, England, and WILLIAM EDWIN HEYS, a resident of Bushey, in the county of Hertford, England, both subjects of the King of Great Britain and Ireland, have invented new and useful Improvements in the Manufacture of Detersive and Emulsive Agents, of which the following is a specification.

We have previously manufactured soaps and other detersive and emulsive agents from materials consisting of or containing proteins, farinaceous and analogous matters with and without contained or added oils, fats or fatty acids by treating them with or by means of concentrated solutions of caustic soda or caustic potash in the cold.

We have since found that we may more economically and conveniently produce the detersive and emulsive agents by acting upon the proteins and upon the farinaceous and analogous matters or upon substances containing either or both of them, in the presence or absence of oils, fats or fatty acids, by means of ordinary solid caustic soda or ordinary solid caustic potash by mere admixture in the cold.

The present invention consists in treating the proteins and/or farinaceous or analogous matters or substances containing either or both, in a finely divided or pulverized condition and in the presence or absence of oils, fats or fatty acids, with, or mixing therewith, ordinary solid caustic soda or caustic potash, preferably also in a finely divided or pulverized condition, with the addition of only sufficient water which together with the water mechanically combined with the raw materials will effect the reaction and produce a physically dry powdered or pulverulent product.

Preferably the proteins and/or farinaceous matters or substances are reduced to the fineness of flour and the alkalis may be similarly reduced. The degree of fineness, however, is less important for the alkalis than for the proteins and/or farinaceous matters or substances.

By way of example, and assuming that ground maize or maize flour or meal be used, then for each 100 lbs. of maize we employ from 15 to 20 lbs. of crushed or powdered caustic soda or its equivalent weight of caustic potash. If a glycerid or fatty acid be added to the flour or meal an equivalent further amount of caustic alkali to effect the saponification thereof must also be added.

The necessary amount of water which together with the water mechanically combined with the raw materials themselves will effect the chemical reaction may be added to the maize before the admixture of the caustic alkali therewith or it may be added after admixture. Usually we spray into the mixture as much water as will bring up the total quantity to from 20 to 30 per cent. of the weight of the maize used.

The several ingredients are intimately mixed and the whole operation may be completed in from 10 to 15 minutes. The reaction is continued in the cold after the mixture is removed from the mixer, for about 48 hours, more or less, during which time the mixture should not be unnecessarily exposed to the air.

By the above described process we obtain a physically dry detersive and emulsive product or agent.

In the claims, proteins, farinaceous and analogous substances have been generically indicated by the term "vegetable materials," but it is to be understood that proteins of animal origin are deemed to be the equivalent of such vegetable materials. Likewise the term "fatty acids" as used in the claims, is regarded as the full equivalent for oils and fats.

What we claim is:—

1. The process of producing a detersive and emulsive agent from vegetable materials which consists in mixing, in the cold, the said materials in pulverized form with solid caustic alkali with the addition of only sufficient water to effect the reaction without the application of heat.

2. The process of producing a detersive and emulsive agent from vegetable materials which consists in mixing, in the cold, the said materials in pulverized form with a fatty acid and solid caustic alkali with the addition of only sufficient water to effect the reaction between the constituents of the mixture.

3. The process of producing a detersive and emulsive agent from vegetable materials which consists in mixing, in the cold, the said materials with solid caustic alkali in the presence of a less quantity of water than can be absorbed by said vegetable materials without the application of heat.

4. The process of producing a detersive and emulsive agent from vegetable materials which consists in mixing, in the cold, the said materials with a fatty acid and solid caustic alkali in the presence of a less quantity of water than can be absorbed by said vegetable materials.

In witness whereof we have hereunto set our hands.

ROBERT MACPHERSON,
WILLIAM E. HEYS.